United States Patent [19]

Hughes

[11] Patent Number: 4,883,182

[45] Date of Patent: Nov. 28, 1989

[54] TAMPER EVIDENT CAPSULE AND INSERT DEVICE

[76] Inventor: Raymond J. Hughes, P. O. Box 801, Mantoloking, N.J. 08738

[21] Appl. No.: 142,976

[22] Filed: Jan. 12, 1988

[51] Int. Cl.$^4$ .............................. A61K 9/48; A61J 3/07
[52] U.S. Cl. .................... 206/534; 206/807; 220/8; 220/DIG. 34
[58] Field of Search ............ 220/8, DIG. 34; 53/900; 206/807, 528, 534, 540; 428/283

[56] References Cited

U.S. PATENT DOCUMENTS

| | | | |
|---|---|---|---|
| 1,774,258 | 8/1930 | English | 53/900 |
| 1,894,115 | 1/1933 | Murphy | 604/410 |
| 1,931,765 | 10/1933 | Leever | 220/DIG. 34 |
| 2,568,094 | 9/1951 | Smith | 53/140 |
| 3,173,840 | 3/1965 | Hostetler et al. | 53/900 |
| 3,308,217 | 3/1967 | Lowry et al. | 264/117 |
| 3,702,653 | 11/1972 | Mottin et al. | 206/807 |
| 3,885,026 | 5/1975 | Heinemann et al. | 424/14 |
| 3,924,736 | 12/1975 | Bell et al. | 206/491 |
| 3,926,817 | 12/1975 | Nakajima et al. | 252/11 |
| 3,927,195 | 12/1975 | Messora | 220/8 |
| 4,027,670 | 10/1976 | Bronner | 220/DIG. 34 |
| 4,507,115 | 3/1985 | Kambara et al. | 604/135 |
| 4,522,666 | 6/1985 | Wittwer | 156/69 |
| 4,525,416 | 6/1985 | Hammerschmidt et al. | 428/916 |
| 4,543,138 | 9/1985 | Bollinger et al. | 428/916 |
| 4,557,505 | 12/1985 | Schaefer et al. | 283/81 |
| 4,584,817 | 4/1986 | Yamamoto et al. | 53/900 |
| 4,652,473 | 3/1987 | Han | 428/916 |
| 4,677,812 | 7/1987 | Tayebi | 53/900 |

OTHER PUBLICATIONS

United States Pharmacopeia XX, pp. 1017, 1020, 1021, 1022, 1023, 1024. Federal Food, Drug, and Cosmetic Act, Sec. 201 (21 U. S. C. 321). Poison Prevention Packaging Act, Secs. 2, 3, 4, and Regulations.

Primary Examiner—Willard Hoag
Attorney, Agent, or Firm—Seidel, Gonda, Lavorgna & Monaco

[57] ABSTRACT

Plural chamber hard cap and body type capsules, each comprising two or more cooperational separately formed component capsules, dissimilar in transverse cross section, which are fixed in position relative to each other, having at least one inner component capsule positioned and fixed within an outer capsule; providing thereby plural chamber capsules, each having at least one transparent, clear, or translucent body part chamber to contain medicament or any other desired substance or device, and at least one other transparent, clear, or translucent body part chamber to contain a cooperational ingestible, disintegratable capsule insert device which is externally visible to the sighted user or consumer, providing thereby a tamper-evident capsule.

8 Claims, 2 Drawing Sheets

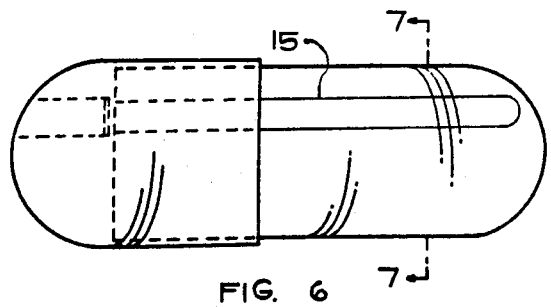
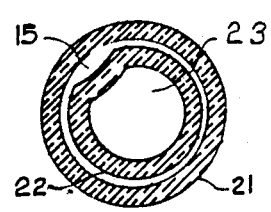
FIG. 6  FIG. 7
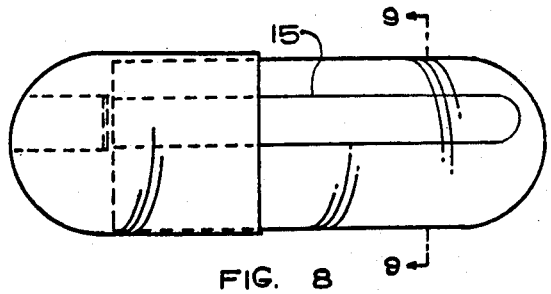
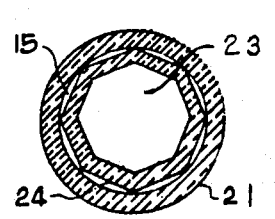
FIG. 8  FIG. 9
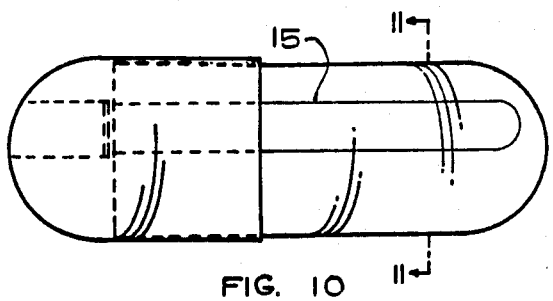
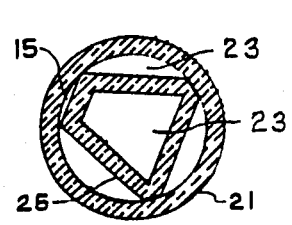
FIG. 10  FIG. 11
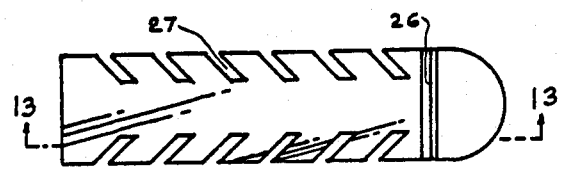
FIG. 12
FIG. 13

TAMPER EVIDENT CAPSULE AND INSERT DEVICE

This application is a division of international application Ser. No. PCT/US86/02642, filed Dec. 8, 1986, which was a continuation-in-part of Ser. No. 739,624 filed May 31, 1985.

BRIEF SUMMARY OF INVENTION

The present invention relates to hard cap and body type capsules and insert devices, and to methods for making plural chamber hard capsules and cooperational tamper evident ingestible, disintegratable capsule chamber insert devices, and to the steps for inserting the devices therein.

DISCUSSION OF PRIOR ART

In the heretofore, the sole means for making plural chamber hard capsules has been the invention titled "Apparatus For Making Capsule Having Plural Chambers (As amended)" disclosed in application Ser. No. 739,624, filed May 31, 1985 in the United States Patent and Trademark Office; Notice of Allowance mailed May 20, 1986.

The cooperational, tamper evident, ingestible, disintegratable capsule insert device disclosed and claimed in the present invention, entitled "Flex-Alert Capsule Insert" is the subject of Disclosure Document No. 145,200, filed Jan. 30, 1986 in the United States Patent and Trademark Office.

OBJECTS

Accordingly, it is an object of the present invention to provide plural chamber hard cap and body type ingestible capsules, and a method for making same, by combining at least two separately formed cooperational capsules which are dissimilar in transverse cross section and which are fixed in place, one within another, and in appropriate relative position to each other; each capsule so combined having more than one chamber, to contain in at least one chamber any desired quantity of pharmaceutical, dietary, or nutritional substance or unit of device for human or other animal consumption or use, and to contain in at least one other chamber of sufficient size and of equal or lesser capacity, and of suitable configuration and design, a cooperational ingestible, contrasting, distinctive, disintegratable, insert device; or an appropriate quantity of other bland, inert, or otherwise innocuous ingestible cooperational substance of a distinctive color, multicolor, or varicolor, which contrasts in appearance with the pharmaceutical, dietary, or nutritional substance or unit of device so contained, and which may be of any appropriate composition, consistency, and degree of glissance, which provides thereby, after such insertion, an externally visible means for the sighted user or consumer to detect, before use, through the clear, transparent, or translucent wall of its body or base part whether the capsule has been opened after its original filling and closure, by means of contrasting visible evidence of its reopening, in the form of changed physical appearance of the fragmanted disintegratable insert device; in this manner providing a capsule vehicle which is tamper evident.

It is also an object of the present invention to provide means whereby a preformed strip of hard capsule forming film, made of methylcellulose, gelatin, or other suitable material is positioned within the cleft of a plural chamber hard capsule cleft dipping mold pin prior to dipping the dipping pin into a dipping solution, the strip of pre-formed hard capsule forming film being of appropriate dimensions and configuration to fit and cooperate within the periphery of the dipping pin cleft and having readily detachable means of its temporary retention therein, for and during the dipping and drying stages of the plural chamber hard capsule film forming operation, and its subsequent release therefrom; and to provide also a means of attachment of the pre-formed hard film strip within and to the main body parts of the hard capsule which is formed by the dipping and drying operation.

It is also an object of the present invention to provide a temper-evident capsule and cooperational chamber insert device which is an immediate container for dispensing, administering, and delivering any dietary, nutritional, or pharmaceutical substance or device, or medicament, which vehicle meets certain definitions and standards as set forth in the unified United States Pharmacopeia XX and National Formulary XV are recognized as official compendia in numerous statutes, among which are the federal Food, Drug, and Cosmetic Act and the Poison Prevention Packaging Act, and which include certain standards and requirements of the federal Consumer Product Safety Commission. These statutes and their regulations include such definitions and standards by reference. Specifically, certain definitions excerpted from the Poison Prevention Packaging Act which, among others, are met by the present invention are as follows:

"Sec. 2. For the purpose of this Act

"(2) The term "household substance" means any substance which is customarily produced or distributed for sale for consumption or use, or customarily stored, by individuals in or about the household and which is "(c) a food, drug, or cosmetic as those terms are defined in section 201 of the Federal Food, Drug, and Cosmetic Act (21 U.S.C. 321);

"(3) The term "package" means the immediate container or wrapping in which any household substance is contained for consumption, use, or storage by individuals in or about the household, . . . "

Safety standards and other consumer directed considerations and objectives which, among others, are met by the present invention are as follows:

"Although special packaging should not be difficult for normal adults to open, it is recognized that some individuals having physical limitations, e.g., some elderly persons or arthritics, may have difficulties." (USP XX—P. 1020)

"Stability considerations should include not only the specific compendial requirements, but also changes in physical appearance of the product that would warn users of the product that its continued integrity is questionable." (USP XX—P. 1023).

"The stability parameters of a drug dosage form can be influenced by environmental conditions of storage ( . . . ), as well as the package components." (USP XX—P. 1023).

" . . . it is recognized that control beyond the dispenser or seller is difficult." (USP XX—P. 1023).

Accordingly, it is a further object of the present invention to provide a method for making and inserting in at least one chamber of a plural chamber capsule a cooperational fragmented disintegratable insert device of suitable configuration and size, and of any appropriate consistency, composition, and degree of glissance, which provides thereby, after such insertion, an externally visible means for the sighted user or consumer to detect, before use, through the clear, transparent, or translucent wall of its body or base part whether the capsule has been opened after its original filling and closure, by means of contrasting visible evidence of re-opening, in the form of changed physical appearance of the fragmented disintegratable insert device; in this manner providing a capsule which is tamper evident.

It is also an object of the present invention to provide a relatively low cost means of making a cooperational disintegratable plural chamber capsule insert device by re-use of the excess, scrap, or waste material, ordinarily approximately 17% to 24% of the capsule material used, remaining after drying and trimming of dip molded hard capsules made by conventional method. In a preferred embodiment of the present invention, such excess, scrap, or waste material is shredded or granulated or pulverized and agglomerated or otherwise suitably composited, and processed and formed to provide the desired cooperational disintegratable capsule chamber insert device for insertion into a plural chamber capsule, and by this means to form a tamper-evident plural chamber capsule.

Further objects and advantages of the present invention will become apparent from a consideration of the drawings and ensuing description thereof.

BRIEF DESCRIPTION OF DRAWINGS

In the drawings:

FIGS. 6 and 7 are an elevational and sectional view through line 7—7, respectively, of a plural chamber hard capsule made by combining two separate cooperational capsules of different sizes, one within the other; the inner capsule being a dissimilar irregular figure in transverse cross section general outline;

FIGS. 8 and 9 are an elevational and sectional view through the line 9—9, respectively, of a plural chamber hard capsule made by combining two cooperational capsules of different sizes, one within the other; the inner capsule being a dissimilar octagon in transverse cross section general outline;

FIGS. 10 and 11 are an elevational and sectional view though line 11—11, respectively, of a plural chamber hard capsule made by combining two separate cooperational capsules of different sizes, one within the other; the inner capsule being a dissimilar trapezoid in transverse cross section general outline;

FIGS. 12 and 13 are a plan and longitudinal section view through line 13—13, respectively, of a plural chamber hard capsule inner chamber wall forming film insert strip.

DETAILED DESCRIPTION OF INVENTION

Figure 1:
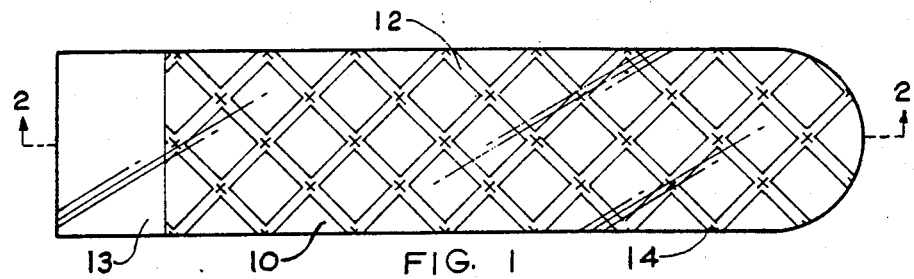
FIGS. 1 and 2 are a plan view and longitudinal section view taken along line 2—2, respectively, of a plural chamber capsule cooperational disintegratable insert device assembly, with removable, withdrawable, temporary retention cover 13 in place.

In a preferred embodiment, referring to FIG. 1, the cooperational disintegratable plural chamber capsule insert device assembly consists of high glissant friable tablets, or otherwise composited and formed granules, pellets, or particles 10, separated by highly glissant interstitial filler or separator strips 12 having bending stress point fracture dimples, cruciform scores, notches, or depressions 14 at interstitial intersections, with a high glissant removable, withdrawable temporary flexible or resilient retention cover 13 overlaying the insert device assembly, which is flat in general profile outline prior to lateral flexure, to provide, upon bending, an appropriate curvature and fragmentation of the insert device for its insertion into a corresponding cooperational capsule chamber 15; and which insert device bears upon or against a flexible supporting base mat or tray 11.

In the immediate foregoing embodiment, the plural chamber capsule cooperational insert device proper is ingestible for humans and other animals and is made of methylcellulose, gelatin, starch, or other suitable material or combination thereof, with appropriate additives such as diluents, binders, disintegrators, glidants, lubricants, and FDA or equivalent approved food coloring as may be necessary or desired to formulate the components of the plural chamber capsule cooperational insert device. Such basic ingredient materials and additives are commonly used in the manufacture of pharmaceutical capsules. The removable, withdrawable temporary retention cover 13 is made of flexible or resilient material such as plastic or metal and is reusable after withdrawal following insertion of the cooperational insert device into the corresponding capsule chamber 15.

Figure 2:
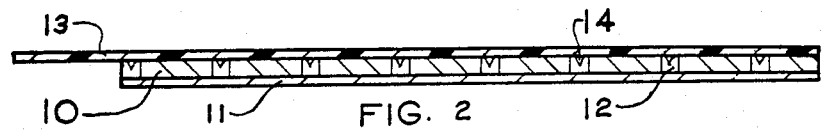
Figure 3:
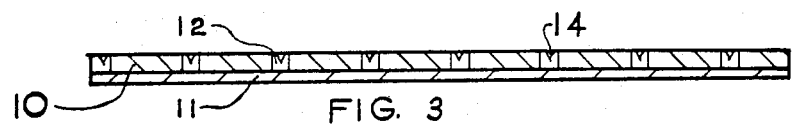
FIG. 3 is a longitudinal section view of the plural chamber capsule cooperational insert device taken along the line 2—2 of FIG. 1, having the removable, withdrawable, temporary flexible or resilient retention cover 13 removed.
Figure 4:
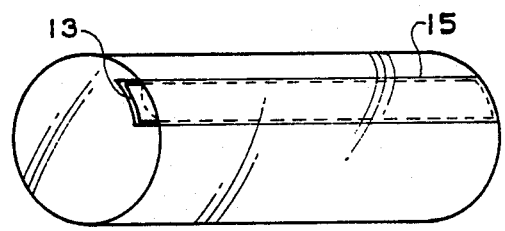
FIG. 4 is a perspective illustration of a plural chamber capsule cooperational disintegratable insert device assembly having a withdrawable, temporary flexible or resilient retention cover 13 in place; the insert device positioned after lateral flexure and resultant fragmentation, by insertion into a corresponding cooperational capsule chamber body part, and prior to removal or withdrawal of the temporary flexible or resilient retention cover 13.
Figure 5:
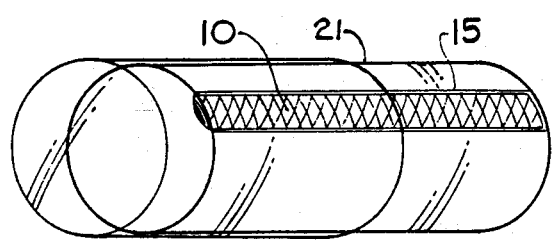
FIG. 5 is a perspective illustration of a plural chamber capsule cooperational fragmented disintegratable insert device in place after lateral flexure and resultant fragmentation and insertion within a corresponding capsule chamber, and after removal of the temporary withdrawable or resilient retention cover 13.

Referring to FIG. 2, the plural chamber capsule cooperational insert device assembly is made in a configuration and of appropriate dimensions to fit within and cooperate with, and to conform to the corresponding configuration, curvature, and dimensions of a cooperational chamber 15 of a plural chamber capsule FIGS. 4 and 5, upon bending or flexure, and insertion and containment of the insert device FIG. 1 therein. The lateral bending or flexure of the insert device FIG. 1 prior to or at time of its insertion into the cooperational capsule chamber 15 is accomplished in such a manner as to cause fracturing of the frangible contrasting interstitial delineating or separating filler strips 12 at at least several intersectional bending stress fracture points 14 without readily obvious displacement, distortion, or disarrangement thereof, and providing thereby at least several retained small separate fragments of the contrasting interstitial delineating or separating filler strips 12. The said insert device FIG. 2 is inserted into a respective chamber 15 of the plural chamber capsule FIGS. 4 and 5, and upon such insertion of the insert device FIG. 2, the thin, temporary removable flexible or resilient retention cover 13 is withdrawn; and as a result of such withdrawal, a curved space equal to its thickness is provided between the curved inner surface of the outer wall of the capsule cooperational chamber 15 in which the disintegratable insert device FIG. 3 has been inserted, and the curved opposing surface of the capsule insert device FIG. 3. The said insert device FIG. 2 can be inserted by hand or implement or by mechanical means.

In the preferred embodiment of said insert device FIG. 2, the shredded, granulated, or pulverized capsule material is mixed with water and formed into a sheet or strip 10, as by extrusion or casting on a substrate 11, and the water is removed, leaving a film, sheet, or strip of the material. The film 10 of friable material can be manipulated on the substrate 11. A removable retention cover layer 13 is placed thereon, and again in the preferred embodiment, the retention cover 13 is a thin layer of metal or plastic. The layers are not laminated or permanently bonded together.

In an equally preferred embodiment, referring to FIGS. 6 and 7, which are views in elevation and transverse cross section along line 7—7, respectively, the present invention provides means to make a plural chamber hard capsule FIG. 6 consisting of two separately formed component capsules in cooperational combination, which are of different appropriate sizes and which are dissimilar in transverse cross section; i.e., the larger outer component capsule 21 is circular, elliptical, or ovoid, totally or partially, in general outline and the smaller inner component capsule 22 is irregular in general outline; e.g., having at least one general outline segment in the form of an arc, curve, crescent, notch, or angular breaks. The inner component capsule 22 is inserted, aligned, and fixed in place by suitable means in appropriate position relative to the outer component capsule 21, forming thereby at least one smaller chamber 15 and the larger chamber 23; the smaller chamber 15 being provided by the resultant formation of, and within, a space between the inner surface of the outer component capsule 21 wall and a noncontiguous outer surface area of the inner capsule 22 wall.

In another embodiment, referring to FIGS. 8 and 9, which are views in elevation and transverse cross section along line 9—9 respectively, the present invention provides means to make a plural chamber hard capsule FIG. 8 consisting of two separately formed component capsules in cooperational combination, which are of different appropriate sizes and which are dissimilar in transverse cross section, i.e., the larger outer component capsule 21 is circular, elliptical, or ovoid, totally or partially, in general outline and the smaller inner component capsule 24 is equilateral; octagonal, for example, in general outline. The inner component capsule 24 is inserted, aligned, and fixed by suitable means in place in appropriate position relative to the outer component capsule 21, forming thereby at least one smaller chamber 15 and larger chamber 23; the smaller chamber 15 being provided by the resultant formation of, and within, a space between the inner surface of the outer component capsule 21 wall and a noncontiguous outer surface area of the inner component capsule 24 wall.

In a further embodiment, referring to FIGS. 10 and 11, which are views in elevation and transverse cross section along line 11—11 respectively, the present invention provides a means to make a plural chamber capsule FIG. 10, consisting of two separately formed component capsules in cooperational combination, which are of different appropriate sizes and which are dissimilar in transverse cross section; i.e., the larger outer component capsule 21 is circular, elliptical, or ovoid, totally or partially, in general outline and the smaller inner component capsule 25 is nonequilateral; trapezoidal, for example, in general outline. The inner component capsule 25 is inserted, aligned, and fixed by suitable means in place in appropriate position relative to the outer component capsule 21, forming thereby at least one smaller chamber 15 and larger chamber 23, the smaller chamber 15 being provided by the resultant formation of a space between the inner surface of the outer component capsule 21 wall and a noncontiguous outer surface area of the inner component capsule 25 wall.

A further preferred embodiment of the present invention, referring to FIGS. 12 and 13, which are views in plan and longitudinal section along line 13—13, respectively, provides a means whereby a pre-formed strip of hard capsule forming film FIG. 12, made of methylcellulose, gelatin, or other suitable material, is positioned within the cleft of a plural chamber hard capsule cleft dipping pin (not shown) prior to dipping said dipping pin in a dipping solution; said strip of pre-formed hard capsule forming film FIG. 12 being of appropriate dimensions and configuration to fit and cooperate within the periphery of the dipping pin cleft, and having a readily detachable means of temporary retention therein; e.g., at least one notch 26, ridge, crimp, crease, groove, hole, or combination thereof, at or near the periphery of the hard capsule film strip, and having an appropriate corresponding opposite formation on one or both surfaces of the dipping pin cleft wall (not shown) to retain said hard capsule forming film strip FIG. 12 in a position for and during dipping and drying stages of the plural chamber hard capsule film forming operation; and providing also a means of attachment, e.g., a notch or notches 27, a hole or holes, or a combination thereof, at appropriate locations at or near the edges of he pre-formed hard capsule film strip FIG. 12, by inflow and filling, during immersion, of said notches 27 or holes or combination thereof by heated dipping solution and resultant thermally induced capillary action or physical bonding or local consolidation of said hard capsule film strip with the main body of a hard capsule formed by said dipping operation, at and to the inner surface of the outer wall of the plural chamber hard capsule body part which is formed thereby; and providing also a ready means of detachment and release from the dipping pin cleft wall for ejection of said inserted film strip from said dipping pin integrally and unitarily with the hard capsule body part in the subsequent stripping operation.

OPERATION

In a typical operation of the present invention, a plural chamber hard capsule FIG. 5 is made tamper evident when, after insertion of a cooperational disintegratable ingestible insert device into a clear, transparent, or translucent capsule chamber 15, the temporary retention cover 13 is withdrawn, the resulting effect of the provision of the curved space made by said withdrawal, together with a relatively high degree of glissance of the components 10, 11, and 12 of the capsule insert device FIG. 3 is to provide a means whereby, after the cooperational insert device FIG. 3 is inserted in the smaller capsule chamber 15, when the capsule, after its filling and closure, is opened, and its base part 21 is rotated from a vertical position, causing or permitting its contents to empty out totally or partially, both gravity and the relative absence or diminution of surface friction will cause the cooperational fragmented insert device FIG. 3 to empty out simultaneously from the capsule chamber 15. Fragmentation of the interstitial filler or separator strip 12 and the relatively high degree of friability of the component tablets, granules, pellets, or particles 10 will effect disintegration of the insert device FIG. 3 as a result of shear, stress, impact upon another surface, or the disintegrating effect of grasp of the said components by fingers or implement. The disintegrated cooperational device FIG. 3, therefore, will not be capable of integrated re-insertion into the capsule chamber 15 in its original assembled structure, pattern, or design. The disintegration within, or absence of the cooperational insert device FIG. 3 from the capsule chamber 15 thereafter, would be readily apparent and externally visible through the clear, transparent, or translucent outer wall of the capsule chamber 15 and wall of the body part of the capsule FIG. 5; by such means providing a "tell-tale" tamper-evident change in its physical appearance, giving warning to the sighted user or consumer that the capsule, after its original filling and closure, may have been tampered with, and therefore, the continued integrity of its content is questionable. (Cf. USP XX—P. 1023).

As used in this specification, "inner component capsule" means one or more than one inner component of a cooperational capsule combination consisting of an outer capsule and inner capsule assembly, each of the assembly members being separately formed, for making plural chamber hard capsules of the type used for containing medicaments; and each of said inner component members having a transverse cross section which is dissimilar to a corresponding cross section of the larger, outer capsule component member in general outline.

While the above description contains many specifities, these should not be construed as limitations on the scope of the present invention, but rather as exemplifications of preferred and other embodiments thereof; many other variations, modifications, and changes are possible which are within the scope and spirit of the present invention.

I claim:
1. A tamper-evident capsule, comprising:
    a shell;
    an insert disposed within said shell and generally visible from outside said shell;
    said insert adapted to change its appearance when said shell is subjected to physical stress.
2. A tamper-evident capsule as in claim 1, wherein said shell and insert are made of material suitable for oral ingestion.
3. A tamper-evident capsule as in claim 1, wherein said insert comprises a generally flat substrate with a layer of frangible particles attached thereon.
4. A tamper-evident capsule as in claim 1, wherein said insert comprises:
    a generally flat substrate;
    a plurality of discrete areas on said substrate, said areas each having frangible particles attached to said substrate therein;
    said areas being visibly distinct from each other.
5. A tamper-evident capsule comprising:
    an outer shell;
    an inner shell disposed within said outer shell, said inner shell shaped to form an interior chamber and at least one intermediate chamber between the exterior surface of said inner shell and the interior surface of said outer shell;
    an insert disposed within said intermediate chamber and generally visible from outside said shell;
    said insert adapted to change its appearance when said other shell is subjected to physical stress.
6. A tamper-evident capsule as in claim 5, wherein said shell and insert are made of material suitable for oral injection.
7. A tamper-evident capsule as in claim 5, wherein said insert comprises a generally flat substrate with a layer of frangible particles attached thereon.
8. An insert adapted to be inserted into an orally-ingestible capsule, comprising:
    a generally flat substrate;
    a plurality of discrete areas on said substrate, said areas each having frangible particles attached to said substrate therein, said areas being visibly distinct from each other;
    said frangible particles being adapted and arranged to change the appearance of the insert when subjected to physical stress.

* * * * *